(12) United States Patent
Raghoebardajal et al.

(10) Patent No.: US 9,852,549 B2
(45) Date of Patent: Dec. 26, 2017

(54) IMAGE PROCESSING

(71) Applicant: Sony Interactive Entertainment Europe Limited, London (GB)

(72) Inventors: Sharwin Winesh Raghoebardajal, London (GB); Simon Mark Benson, London (GB); Jeremy David Ashforth, London (GB); Ian Henry Bickerstaff, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 15/007,701

(22) Filed: Jan. 27, 2016

(65) Prior Publication Data

US 2016/0217621 A1 Jul. 28, 2016

(30) Foreign Application Priority Data

Jan. 28, 2015 (GB) .................................. 1501397.2

(51) Int. Cl.
*G06T 19/00* (2011.01)
*H04N 13/04* (2006.01)
*G02B 27/01* (2006.01)

(52) U.S. Cl.
CPC ........ *G06T 19/006* (2013.01); *G02B 27/0172* (2013.01); *H04N 13/0429* (2013.01);
(Continued)

(58) Field of Classification Search
CPC ........ G02B 27/0172; G02B 2027/0138; G06T 5/00
See application file for complete search history.

(56) References Cited

U.S. PATENT DOCUMENTS

2010/0157433 A1* 6/2010 Mukawa ................ G03B 21/26
359/633
2012/0206577 A1* 8/2012 Guckenberger ........ G06T 11/00
348/47
(Continued)

FOREIGN PATENT DOCUMENTS

EP 1374765 A1 1/2004
EP 1637975 A1 3/2006
(Continued)

OTHER PUBLICATIONS

Gruebler et al, 'Design of a Wearable Device for Reading Positive Expressions from Facial EMG Signals', IEEE Trans on Affective Computing, vol. 5, No. 3, Jul.-Sep. 2014 Available online at http:/ieeexplore.ieee.org/stamp/stamp.isp?tp=&arnumber=6778017 [Accessed Jul. 17, 2015].
(Continued)

*Primary Examiner* — Thomas Lett
(74) *Attorney, Agent, or Firm* — Lerner, David, Littenberg, Krumholz & Mentlik, LLP

(57) ABSTRACT

An image processing method includes capturing an image of the head of a user of a head mountable display device. The position of the head mountable display device is detected in the image captured by a camera. A region of the user's face that is occluded by the head mountable display device is identified. The portion of the captured image corresponding to the head mountable display device is at least partially replaced with a corresponding portion of a 3D facial model, to provide a modified version of the captured image.

17 Claims, 12 Drawing Sheets

(52) U.S. Cl.
CPC ..... *H04N 13/0468* (2013.01); *H04N 13/0497* (2013.01); *G02B 2027/014* (2013.01); *G02B 2027/0134* (2013.01); *G02B 2027/0138* (2013.01)

(56) References Cited

U.S. PATENT DOCUMENTS

| | | | | |
|---|---|---|---|---|
| 2015/0156716 A1* | 6/2015 | Raffle | ................. | G02B 27/017 455/418 |
| 2015/0212330 A1* | 7/2015 | Li | ..................... | G02B 27/0179 345/419 |
| 2016/0313790 A1* | 10/2016 | Clement | ................ | G06F 3/011 |
| 2016/0341959 A1* | 11/2016 | Gibbs | ............... | G02B 27/0093 |

FOREIGN PATENT DOCUMENTS

| | | |
|---|---|---|
| EP | 1731943 A1 | 12/2006 |
| JP | H1196366 A | 4/1999 |

OTHER PUBLICATIONS

Search Report for Application No. GB1501397.2 dated Jul. 20, 2015.

\* cited by examiner

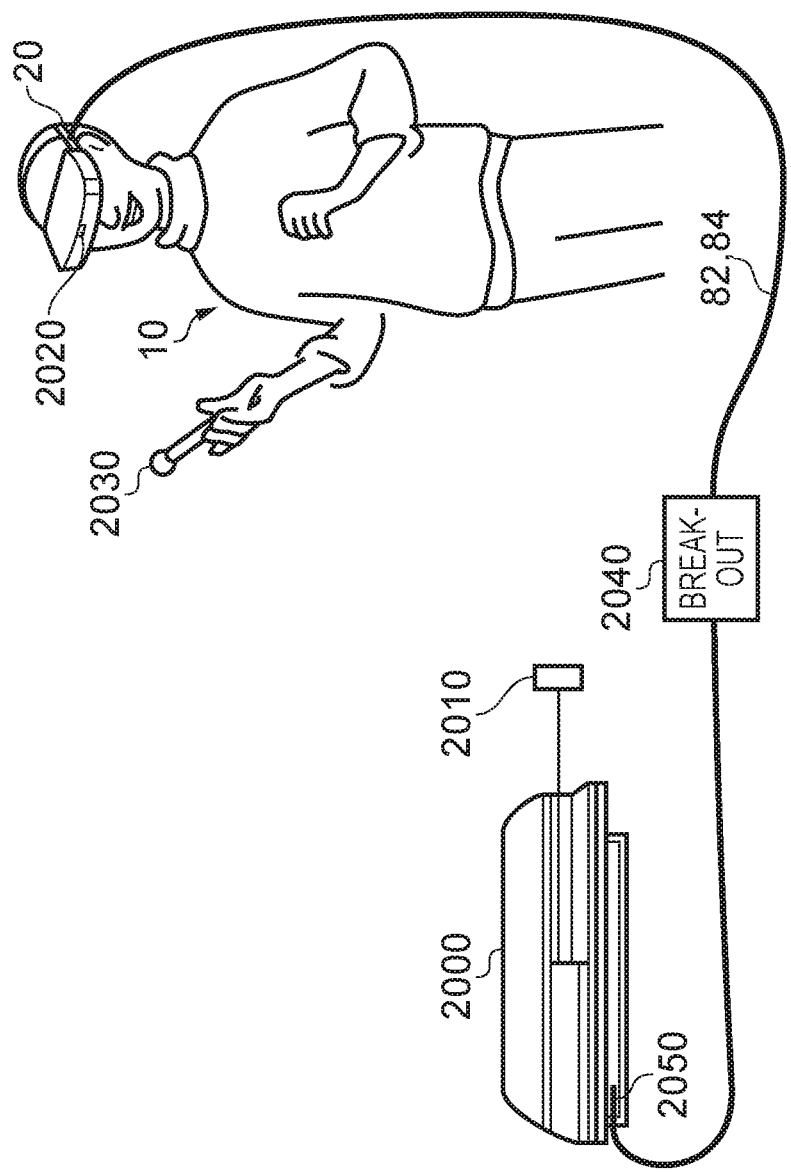

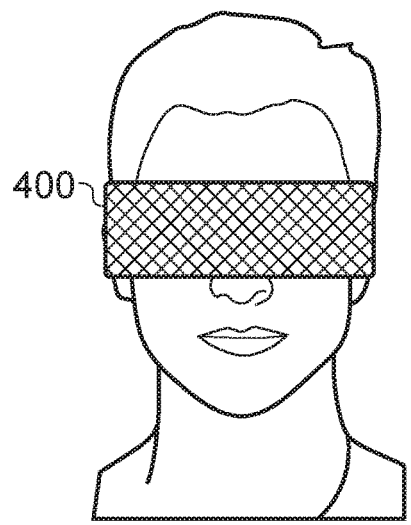
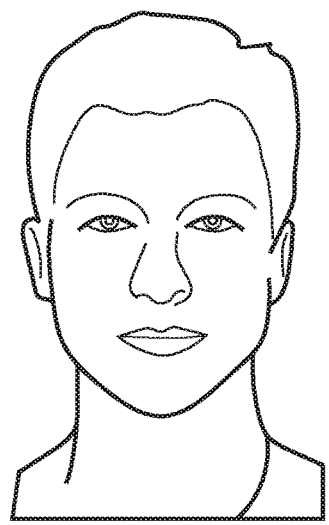
FIG. 10a  FIG. 10b
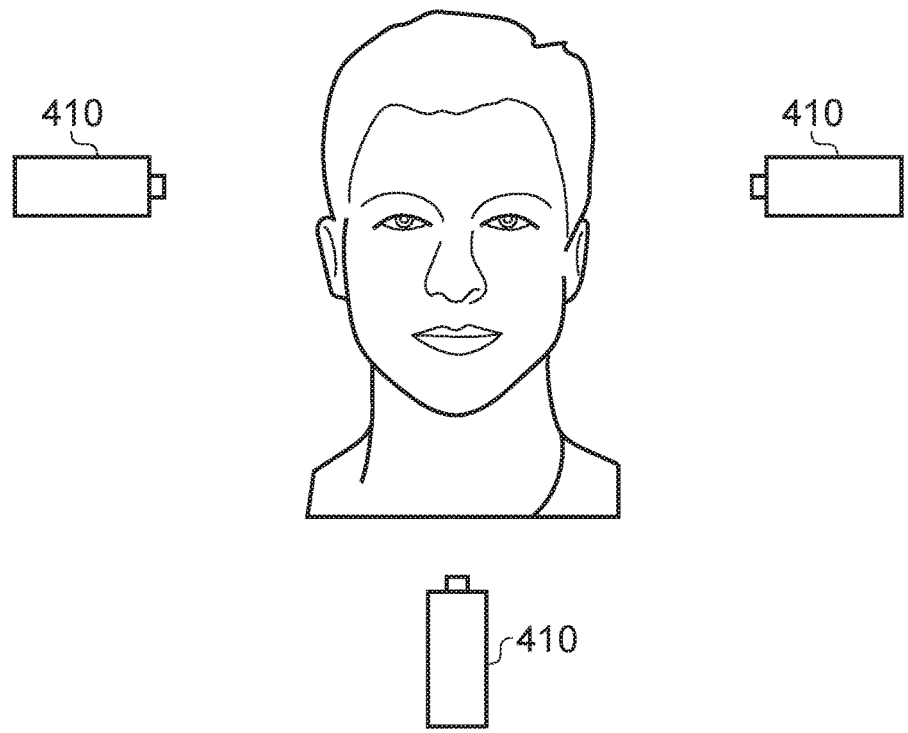
FIG. 12

IMAGE PROCESSING

CROSS REFERENCE TO RELATED APPLICATIONS

The present application claims the benefit of and priority to GB Patent Application No. 1501397.2, filed Jan. 28, 2015, the entire disclosure of which is hereby incorporated by reference herein.

BACKGROUND

Field

This disclosure relates to image processing, for example for image display.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

As background, an example head-mountable display (HMD) will be discussed, although (as described further below) the disclosure is applicable to other types of displays.

An HMD is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, the contents of which are incorporated herein by reference, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications. A common domestic computing application is VoIP ('Voice over Internet Protocol') communication. By using such a webcam or a comparable image capturing device in conjunction with such a service, users may be able to transmit real-time footage of themselves to their contact in addition to their voice. Incorporating an HMD into such a setup offers an improvement in immersion, allowing users to feel as if they are in the room with their contacts.

SUMMARY

The present disclosure addresses or mitigates problems arising from these arrangements.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 schematically illustrates the generation of images in response to HMD position or motion detection;

FIGS. 10a and 10b schematically illustrate occlusion of the face caused by an HMD;

FIG. 12 schematically illustrates an image capturing method;

FIG. 13 schematically illustrates a rendering of an HMD as being substantially see-through;

DESCRIPTION OF THE EMBODIMENTS

Embodiments of the present disclosure can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Figure 1:
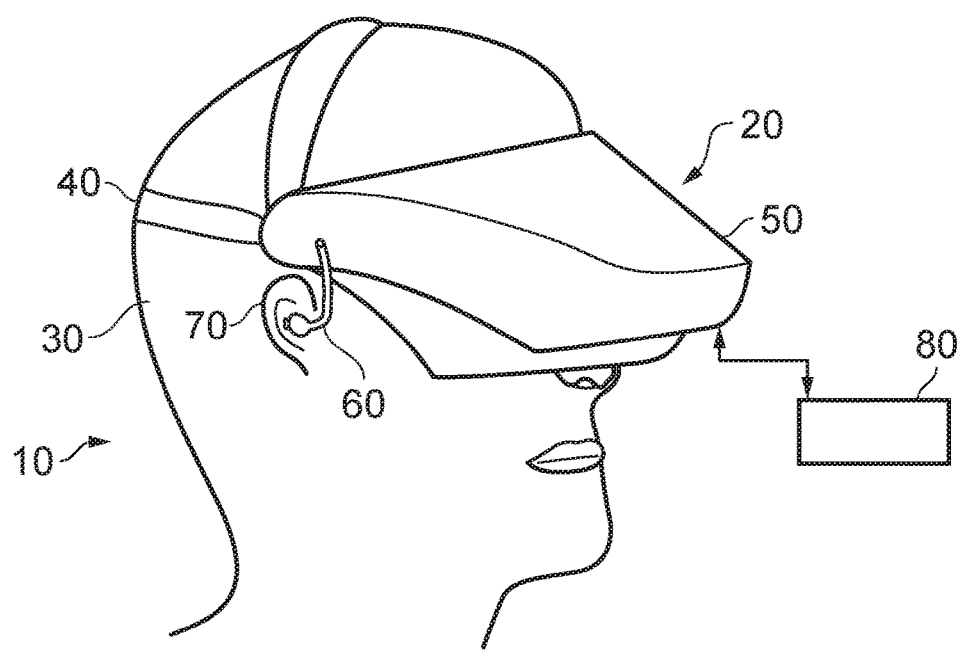
FIG. 1 schematically illustrates an HMD worn by a user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes. One or more electromyography (EMG) sensors 65 are disposed so as to contact the user's face, in normal use, in order to allow the detection of facial muscle activity or movement. The use of this information will be discussed below.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
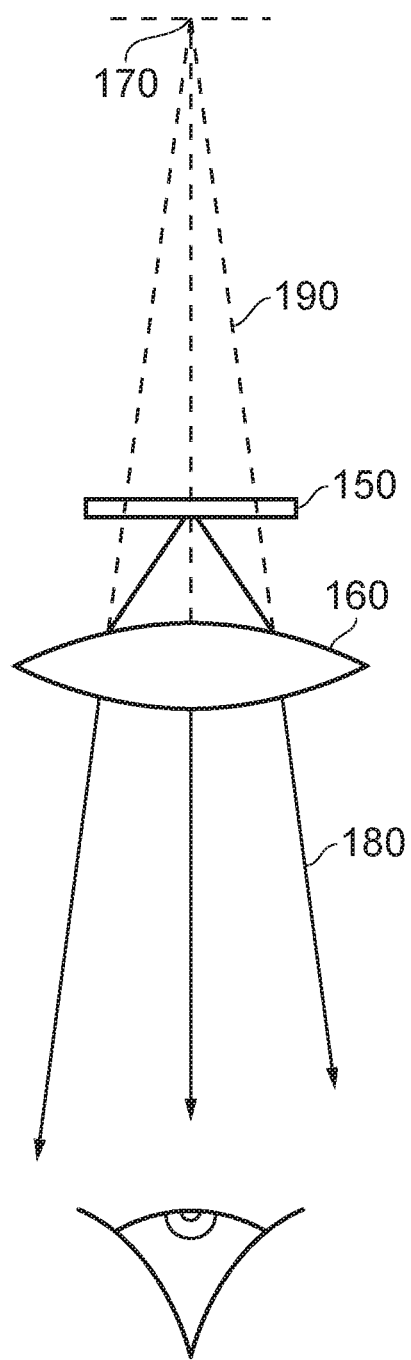
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
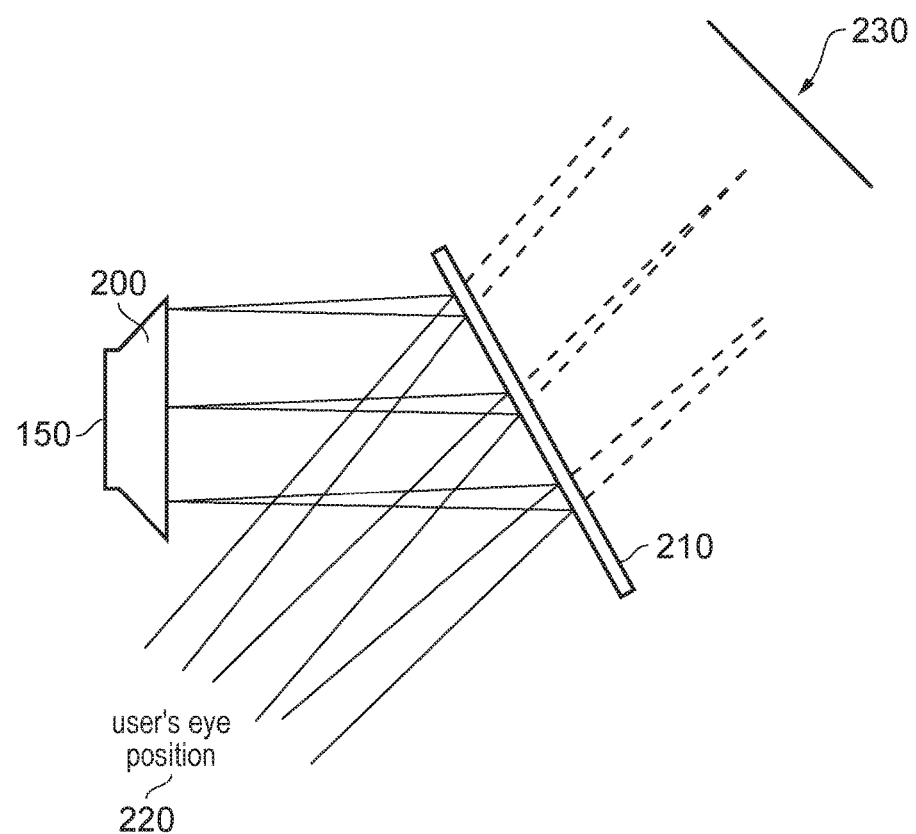
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 15 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

Figure 6:
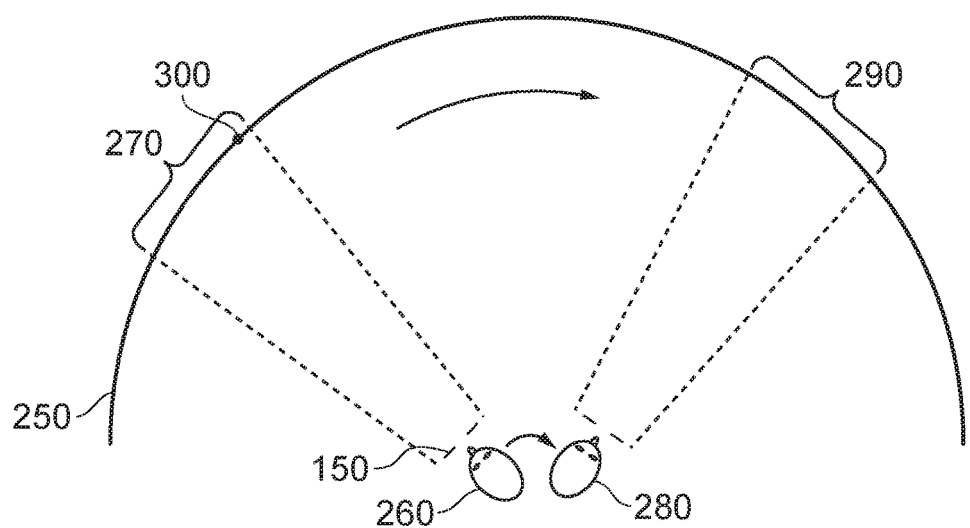
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
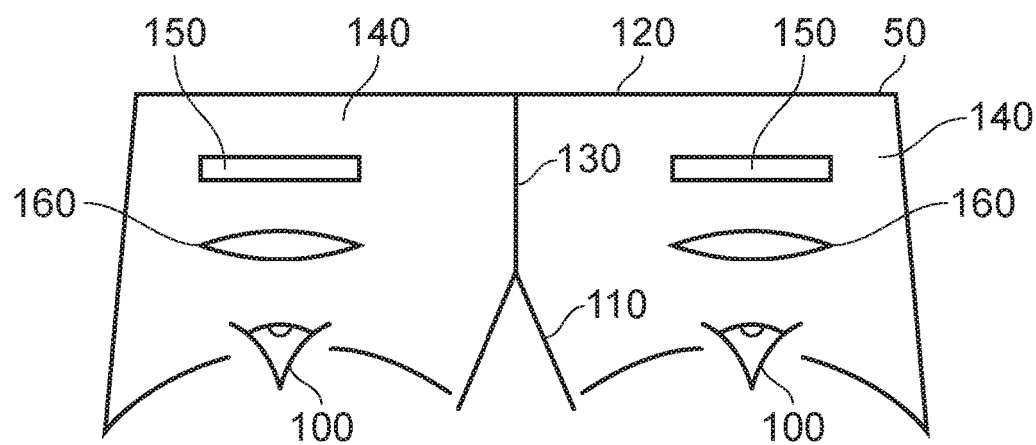
FIG. 2 is a schematic plan view of an HMD.
Figure 7A:
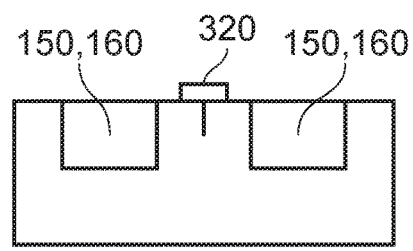
FIGS. 7a and 7b schematically illustrate HMDs with motion sensing.
Figure 7B:
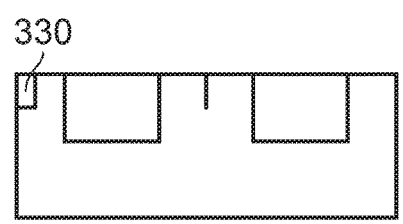

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
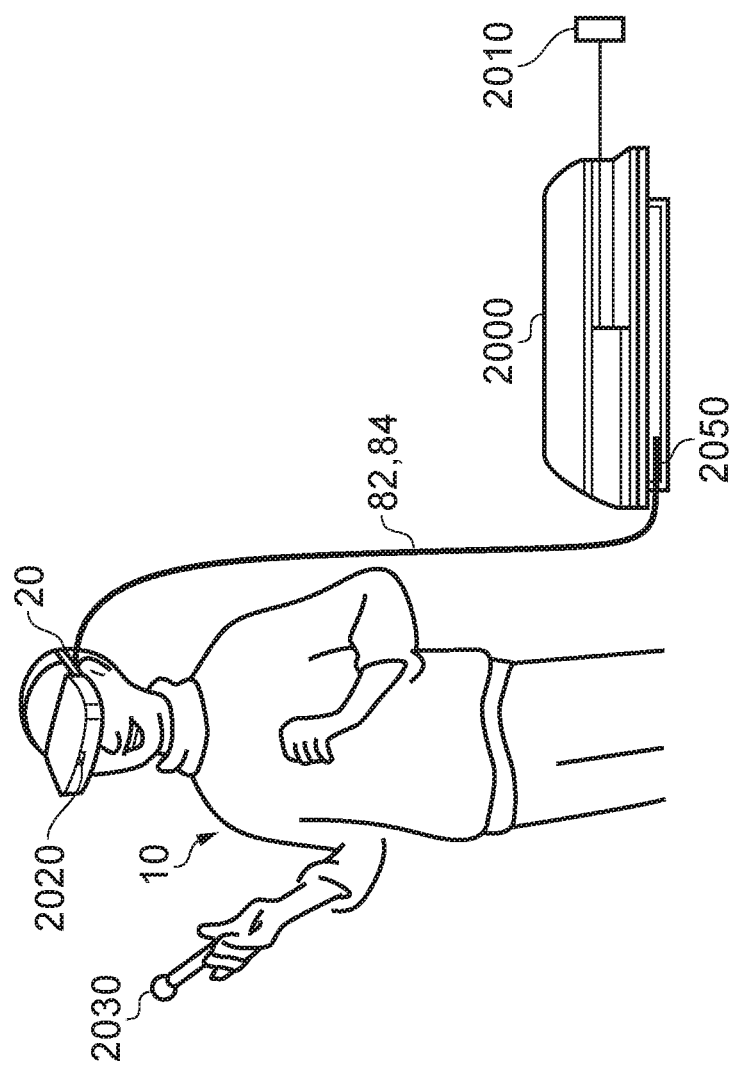
FIG. 8 schematically illustrates a position sensor based on optical flow detection.

FIG. 8 schematically illustrates a user wearing an HMD connected to a Sony® PlayStation 3® games console 2000 as an example of a base device (corresponding to the external video source 80 of FIG. 1), a further example of a base device is a PlayStation 4® games console. The games console 2000 is connected to a mains power supply 2010 and (optionally) to a main display screen (not shown). A cable, acting as the cables 82, 84 discussed above (and so acting as both power supply and signal cables), links the HMD 20 to the games console 2000 and is, for example, plugged into a USB socket 2020 on the console 2000. Note that in the present embodiments, a single physical cable is provided which fulfils the functions of the cables 82, 84. In FIG. 8, the user is also shown holding a hand-held controller 2030 which may be, for example, a Sony® Move® controller which communicates wirelessly with the games console 2000 to control (or to contribute to the control of) game operations relating to a currently executed game program.

The video displays in the HMD 20 are arranged to display images generated by the games console 2000, and the earpieces 60 in the HMD 20 are arranged to reproduce audio signals generated by the games console 2000. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 2050 mounted on the HMD 20 are passed back to the games console 2000 via the cable 82, 84. Similarly, if motion or other sensors are provided at the HMD 20, signals from those sensors may be at least partially processed at the HMD 20 and/or may be at least partially processed at the games console 2000. The use and processing of such signals will be described further below.

The USB connection from the games console 2000 also provides power to the HMD 20, according to the USB standard.

FIG. 9 schematically illustrates a similar arrangement in which the games console is connected (by a wired or wireless link) to a so-called "break out box" acting as a base or intermediate device 2040, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 2040 is fixed to the ground or to a piece of furniture, but rather than having a very long trailing cable from the games console 2000, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

Video calling is a common application for users with a system that is equipped with a camera. Video calling is seen as a way to make phone calls more closely resemble real life, face-to-face interactions. There is a desire to implement the use of HMD devices in this context, as an HMD device could be used to provide an even more immersive experience, making a user feel as if they are present in the room with the other person or persons in the call. This effect could be enhanced by the generation of a virtual environment which the users could share, or a computer generated version of the users' actual rooms.

However, the use of an HMD device may also offer significant drawbacks in that a camera which sends the images of an HMD-wearing caller to the recipient of the call will capture images of the HMD-wearing user with their face obscured by the display unit. This not only makes the experience less like physical interactions (as users would normally be expected to remove the HMD for conversation in person), thus defeating an object of using the HMD device in the interaction, but also makes the user's facial expressions much harder to read by obscuring at least the areas around the eyes. FIGS. 10a and 10b schematically illustrate the problem: in FIG. 10a the user's face is largely occluded by the HMD (represented by the box 400) and a more desirable appearance is illustrated in FIG. 10b in which the HMD is not seen (and therefore the box 400 does not appear in the image) and no part of the face is hidden.

A solution to this problem is to use image processing means to process images for display, for example to the other party or parties in a communications situation, and in doing so either to render the HMD device as a partly see-through object, or to remove it from the image recorded by the camera altogether, rendering the previously-occluded area of the face (or another feature) in its place.

The HMD may be identified and tracked (relative to the camera capturing the images of the HMD-wearing user) in a series of images using any known means, such as the use of a fiducial marker attached to the device or the use of hardware motion detectors mounted on the HMD. When in use, the HMD device is mounted in a manner that is independent of the user (as a given HMD is limited in the number of ways it can be worn) and therefore the position and orientation of the HMD is also indicative of the position and orientation of the user's face.

Figure 11:
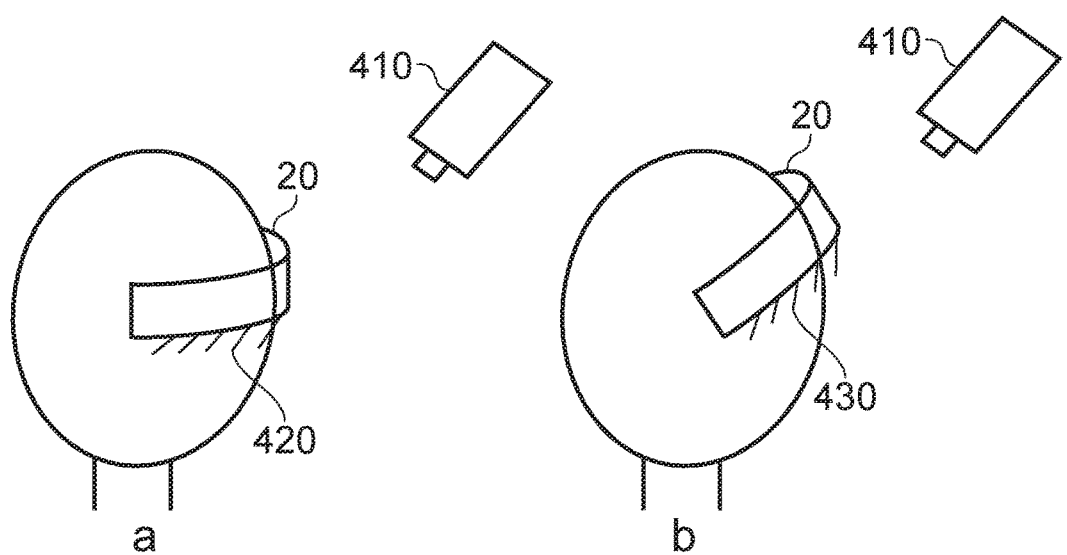
FIG. 11 schematically illustrates the angular dependence of the occlusion relative to a camera.

Image processing means (such as comparison to a reference image) can then be used to identify the region of the user's face that is obscured by the HMD, as although it is mounted in a position that does not change, the orientation of the HMD with respect to the camera will cause different areas to be occluded as illustrated in FIGS. 11a and 11b.

In FIG. 11a, the HMD 20 is substantially horizontal oriented. The shaded region 420 below the HMD represents a region that is occluded in the image obtained by the camera 410. The occluded area extends below the HMD 20 not only to obscure the area around the user's eyes, but also to occlude the region where a user's nose would be. FIG. 11b illustrates a similar arrangement, but with the HMD 20 (and therefore the user's head) tilted upwards relative to the orientation illustrated in FIG. 11a. The shaded region 430 is much smaller here (relative to the region 420 in FIG. 11a) due to the HMD 20 having a more similar angle to the camera 410, and therefore a smaller region of the user's face is occluded by the HMD 20. As a result, it can be seen from a comparison of FIGS. 11a and 11b that depending on the alignment of the camera 410 and the HMD 20, differing amounts of the user's face need to be rendered by an image processing method removing the HMD 20 from the image.

The region of a captured image corresponding to the area of a user's face which is obscured by the HMD may be modified in several ways. In example methods, to simulate a normal conversation, occluded areas in the image are replaced with portions of the user's own face. However, it may also be desirable that the user instead wishes to 'act out' a scene from a movie or take on the role of another person or character in which case the region that is occluded (or the user's whole face) may be replaced with that of an avatar or the facial features of the person or character selected by the user. In a third embodiment, there may be a desire for the HMD to be removed from the images but also a practical limit to the computational power of the processing device. In this situation, a user may select some form of mask to instead replace the HMD and occluded areas in the image, offering a more pleasing image to the user without requiring the greater processing associated with the rendering and simulation of a more life-like face.

Given a fixed position of a camera relative to a user and physical constraints on the head motion of a user (either based upon the physical limits of neck motion or anticipated levels of motion during a video call for example), the maximum area of the user's face that may need to be rendered may be estimated. This information can be used to determine the maximum size of an object or generated facial region supplied to the image modification process in order to replace the region occluded by the HMD.

The generating of replacement image components in different embodiments is described next with reference to FIGS. 12 to 22.

A model of the HMD-wearing user's head and face (or at least a part of the head and face) is generated and is used to render occluded areas of the HMD-wearing user's head and face in images displayed at another display (such as another caller's HMD). As mentioned above, various options are available. For example, the user's actual head and face (or parts of their head and face) could be modelled. In other examples, a model of another head and face could be used, either for the occluded portions or in place of the user's head and face altogether. In examples, the rendering process is such that the HMD is completely removed from the images. In other embodiments, the parts of the image relating to the HMD are mixed or combined with the head/face model so as to render the HMD as though it was transparent.

In some embodiments, the model is of the user's own head and face (or parts of the head and face). The camera (or another camera) is used prior to the HMD being put on by the user to take pictures of the user's head from a number of angles. This could be immediately prior to a particular use session of the HMD or could be part of an initial (for example, one-off) setting up of the apparatus. For example, an image may be taken from the front and each of the left and right sides (although a greater number of images could be used to image a larger area of the head and/or to provide a greater level of spatial and/or angular detail by averaging between the images).

FIG. 12 schematically illustrates a plurality of cameras 410 (or a plurality of camera positions of the same camera) being used to image a user from three different angles as described above. Although the image shows three cameras being used, it could be that only a single camera is used and is relocated to each position in turn or that a user is required to present a different side to the camera for each of a series of images to be captured. These images may then be processed to derive a 3D model of the user's head in which facial features such as the position of the eyes and shape of the face (for example) are identified. This model is then stored in the memory of a computer and is used as a reference.

The model of the user's face may be supplemented with additional information describing the interaction of different muscle groups in the face. This can either be captured through the cameras in a set-up period (asking a user to simulate a number of facial expressions such as a smile, a frown, a blink and the like) or supplied to the image processing application as a general description of the human face. This information can be used to supply more realistic motion to the rendered portions of the face in the processed images, as a mismatch in expression between different portions of the face detracts from the realism of the rendering. This model can then be used in conjunction with facial movement that is identified in the captured images (e.g. a downturned mouth) and translate this into a motion of the occluded portion of the face (e.g. a narrowing of the eyebrows).

The model may then be modified by a user to change their appearance using standard image modifying techniques. This may take the form of purely aesthetic changes such as the removal of skin blemishes or more structural changes such as a change in the size of the model's nose.

This model may be used in a number of ways to implement the present method. For example, the model may be equipped with a virtual version of the HMD being used in a computer program. This model may then be manipulated to be in a particular orientation corresponding to the detected orientation of the real HMD by the camera, thus allowing the computer to calculate which regions are obscured and process the image captured by the camera accordingly.

Alternatively, image analysis techniques may be used to recognise which regions of the face that are obscured by the HMD and define their location with respect to the other facial features that are observed (such as the mouth or ears). The computer may then map regions of the 3D model corresponding to these regions into the captured image to replace the HMD. This mapping may further incorporate information about the interaction of facial muscles as described earlier, causing a variation in the mapping used to correspond to movement of the face.

In a second embodiment, the user does not wish to replace the HMD with captured versions of their own facial features, and instead would prefer to use an alternative. This may be implemented in a similar method to the first embodiment described above, but of course the model generating step is skipped altogether. Instead, a computer generated face or the captured face of another person of similar facial features could be used to approximate the appearance of the user; or alternatively the user may download other faces such as those of well-known celebrities or fictional characters to offer the option of not simulating the user's own face. This facial mapping could also be extended to cover the whole of the user's face, rather than just the portion that is hidden from the camera.

As an alternative feature, the model that is applied could be determined by the other person in the call. For example, a user may be used to the appearance of their contact and desire a change; the user could vary their contact's appearance in the video call to resemble another person (for example) without the contact's input to improve their appearance or for novelty purposes. This feature could be implemented by applying the image processing upon receiving an image from the other user's camera as opposed to the other user transmitting an already processed image.

Figure 13:
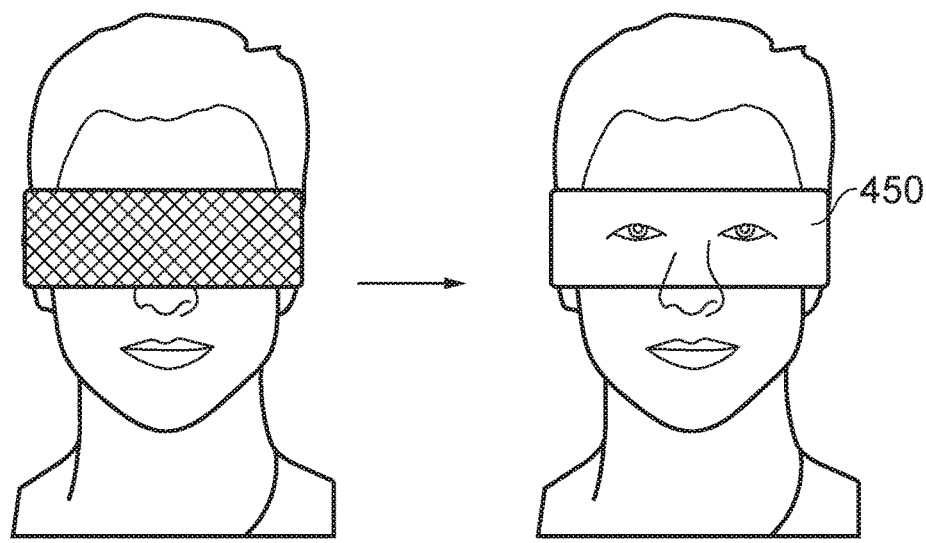

It should be noted that in the above described embodiments, the full replacement of the HMD in a captured image is not required—it is also possible that the HMD is rendered to be at least partially see-through and the facial features are rendered to appear below this, as is illustrated in FIG. 13. FIG. 13 illustrates an image modification that switches a partially occluded image of a user's face for an image in which the facial features are visible, albeit slightly obscured by a partially see-through rendering of the HMD 450. The rendering of a partly obscured region of the face can offer its own advantages, as for example it allows another person in the call to quickly establish whether an HMD is being used by the user. In addition to this, if a user chooses to apply a low quality rendering to the captured image the partial concealment may prevent someone viewing the processed image from noticing the poor quality as a perfectly clear view of that region of the face would not be expected.

Figure 14:
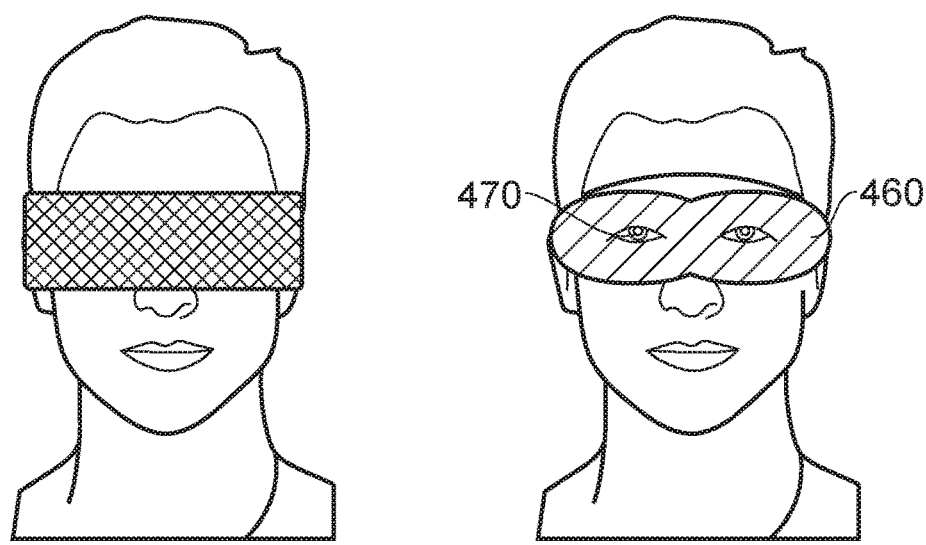
FIG. 14 schematically illustrates a rendering of a mask in place of an HMD.

In a third embodiment, the HMD is instead replaced in the captured image by an alternative face-obstructing feature. This could take the form of a mask or other accessory such as a pair of sunglasses. The mask could be just enough to cover the same features as the HMD, or one large enough to cover the whole of the user's face. FIG. 14 illustrates an example of a mask 460 that is used to cover the same region as that occluded by the HMD, presenting an alternative occluding feature which may be preferable to the user. The mask may also leave holes 470 for the eyes to be seen through, as eye contact makes the communication seem more natural. Methods for rendering of the eyes are discussed in more detail later in this disclosure.

The position of the mask in the image is mapped to the position of the HMD as detected by the camera, and the size may be determined by the user or it may vary with the angle of the user's face (as this causes the obscured region to change in size) for example.

This embodiment could be advantageous in that is allows a user to maintain their anonymity, which may be important when engaging in video calls with strangers (such as in chat rooms). Additionally, a mask will not need to be animated to move with a change in the facial expressions of a user to the same degree as a rendered portion of the user's face and therefore this embodiment provides a method that would be easier to implement on a device with lower processing power.

In each of the above embodiments, information about the user's eye movements (including blinking) may be incorporated in order to render motion of the virtual eyes for improved realism. This could be motion that is determined by a computer or actual detected motion of the user's eyes, for example by eye tracking cameras mounted inside the HMD.

Figure 15:
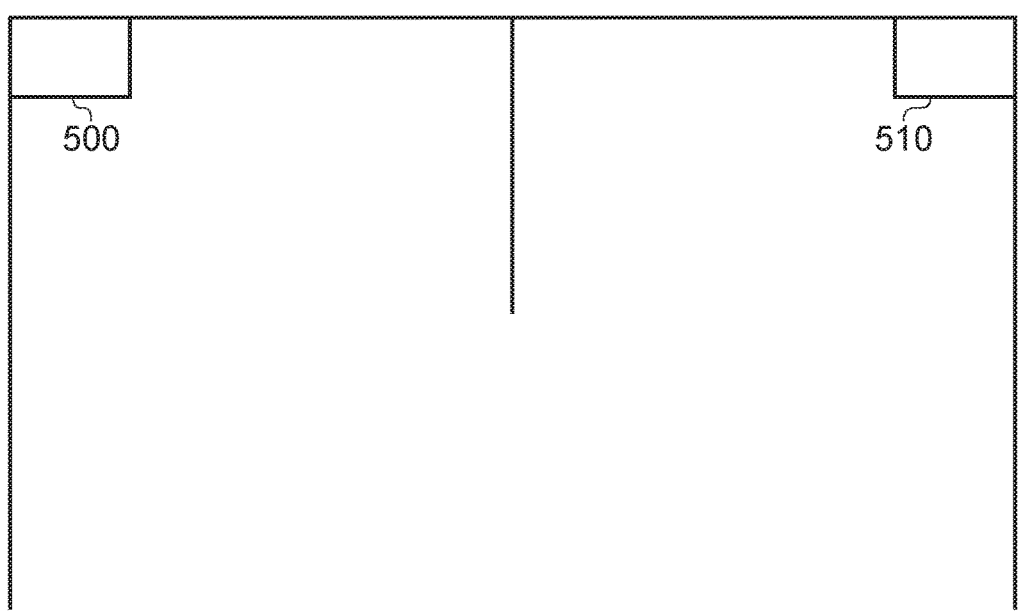
FIG. 15 is a further schematic plan view of an HMD.

FIG. 15 is a further schematic plan view of an HMD similar to the plan view of FIG. 2 described above. Features already described in connection with that Figure will not be described again. A pair of eye-tracking cameras 500, 510 are provided within the compartments corresponding to each eye tries to generate images of the wearer's eyes in use. Accordingly, the eye-tracking cameras 500, 510 are directed in a backwards direction relative to the orientation of the user's head, so that they look back at the user's eyes. Note that the cameras 500, 510 in FIG. 15 can be disposed anywhere with respect to the compartments corresponding to each eye, as long as they do not obscure the user's view of the displayed images; they are just shown in the outer corners by way of one schematic example.

To illuminate the user's eye, the cameras 500, 510 can rely on illumination provided by the displayed images within the HMD or, if that is insufficient, on infrared or other illumination directed towards the user's eyes.

Determination of the eye motion by the computer could incorporate either pseudo-random motion, such as simulation of a user looking about a computer display and blinking at predetermined intervals, or it could take the form of determining what a user is focused on. Primarily this could be assumed to be a video stream of the other person engaging in the video call, but if the user interacts with other onscreen elements (such as a web browser or other application) then the rendered eyes in the image could be made to move to simulate either the following of a cursor or looking in the direction of the other application for example.

Further to this, facial electrodes could be used to provide information about facial expressions using a technique such as electromyography (EMG). This could be used to detect movements that are occluded, such as a blink or a wink, or motions of the face outside of the HMD-covered region. In the latter case, the motion could be combined with the earlier-mentioned facial muscle interaction mapping to determine the motion of the face in regions that cannot be seen by the camera.

The described image processing method could also be implemented in other applications than just video calling. A first example is that of a user filming a video in which the camera is directed at them. An example of this is in filming a video blog (a 'vlog') or other video content. In this application, a user may wish to interact with a computer in order to play sound clips or demonstrate features of a game and therefore use an HMD as the display device. However, the presence of an HMD in the image would not be desired, and so the present method could be used to remove this.

A further application is that of video gaming. A user could play a video game with a camera directed towards them and use this feed in the game itself to either render an image of their face within the game (for example in character customisation) or their whole body for the purpose of playing a game with a third person perspective. In either application, the removal of the HMD from the rendered image would be desirable as it may not be practical to capture images before the HMD is put on by the user; this is particularly true of the third party gaming application in which the captured real-time motion of the player could be used as the motion of the character.

Figure 16:
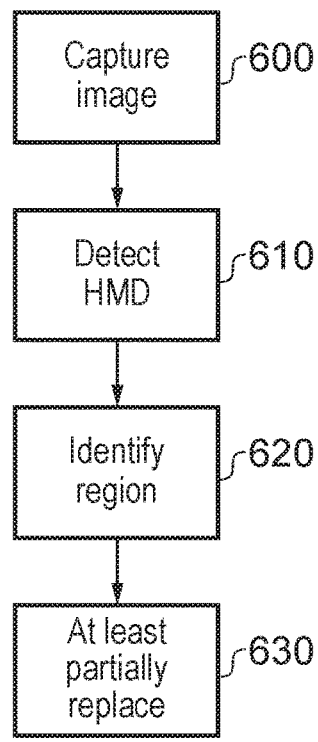
FIG. 16 schematically illustrates an image processing method.

FIG. 16 schematically illustrates an image processing comprising:

at a step 600, capturing an image of the head of a head mountable display device user;

at a step 610, detecting the position of a head mountable display device in the image captured by the camera;

at a step 620, identifying a region of the user's face that is occluded by the head mountable display device, for example by comparing a captured image of the user's face with a reference image; and at a step 630, at least partially replacing the region of the captured image corresponding to the head mountable display device with a corresponding portion of a 3D facial model, to provide a modified image.

In some embodiments, the replacement portion in the modified image may comprise a superposition of a partly transparent image of the head mountable display device and the 3D facial model portion.

Figure 17:
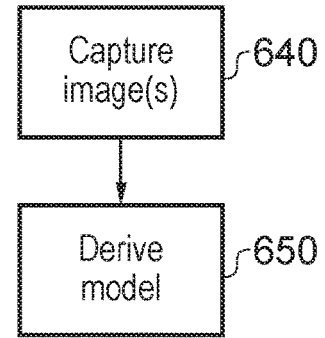
FIG. 17 schematically illustrates a method for generating a head model.

FIG. 17 schematically illustrates a method for generating a head model, for example using the arrangement discussed with reference to FIG. 12, comprising: at a step 640, capturing one or more images of a user's face (without the HMD in place) and, at a step 650, deriving the 3D facial model from captured images of the user's face. In other embodiments, however, as discussed above, the 3D facial model is a model of a face other than the user's.

Figure 18:
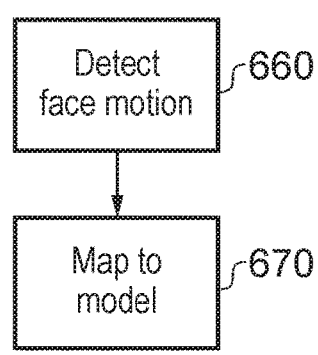
FIG. 18 schematically illustrates the mapping of facial motion to the rendering of a head model.

FIG. 18 schematically illustrates the mapping of facial motion to the rendering of a head model. As discussed above, the 3D facial model may comprise a mapping of the interactions of facial muscles. In such a situation, and referring to FIG. 18, at a step 660 the facial motion of the user wearing the HMD is detected (for example, by the cameras of FIG. 15 or by one or more other cameras directed towards the user's face, and/or by electrical or other sensors such as one or more EMG sensors of FIG. 1. At a step 670 the facial model used in the rendering of the user's head is modified according to the detected facial movements.

Figure 19:
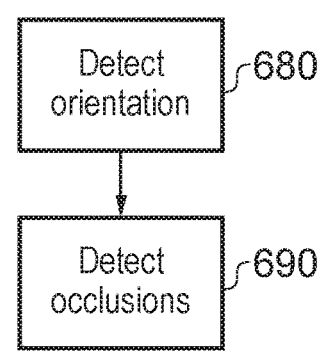
FIG. 19 schematically illustrates the detection of occlusions based on HMD orientation.

FIG. 19 schematically illustrates the detection of occlusions based on HMD orientation, according to the techniques discussed above with reference to FIG. 11. The occluded portion of the user's face may be larger than the physical height and width of the HMD, because the HMD extends away from the head and so can occlude additional regions if viewed by the camera other than straight on from the front. At a step 680 the orientation of the HMD is detected, for example by an orientation sensor in the HMD and/or by detecting the positions or relative positions of fiduciary markers on the HMD. At a step 690 occlusion regions are detected with reference to the user's face with respect to the detected orientation. Based on the detected occlusions there may be a need to render image areas not directly covered by the HMD, so in some embodiments the facial model includes a representation of portions of the face other than those directly overlaid by the head mountable display in use. This therefore provides an example of detecting facial muscle motion; and changing the generation of the modified image in accordance with the detected facial muscle motion. The step of detecting facial muscle motion may comprise estimating the facial muscle motion from captured images. The step of detecting facial muscle motion may comprise detecting the facial muscle motion using electromyography.

Figure 20:
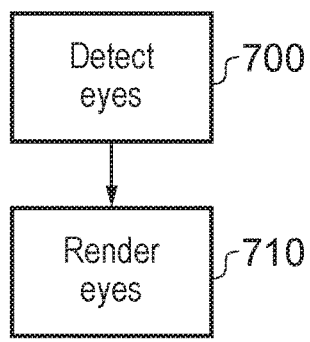
FIG. 20 schematically illustrates the rendering of eye motion.

FIG. 20 schematically illustrates the rendering of eye motion, for example by detecting the eye motion using one or more cameras mounted on the head mountable display device and comprising rendering motion of the eyes in the modified image. At a step 700 the position and/or orientation of the user's eyes is either detected (from one or more cameras such as those shown in FIG. 15) or generated by a computer or predicted (for example, from on-display motion and/or the location, on the display, of a most significant feature such as another user or a currently speaking user in a conversation. At a step 710 a representation of the user's eyes are rendered as part of the rendered modified image.

Figure 21:
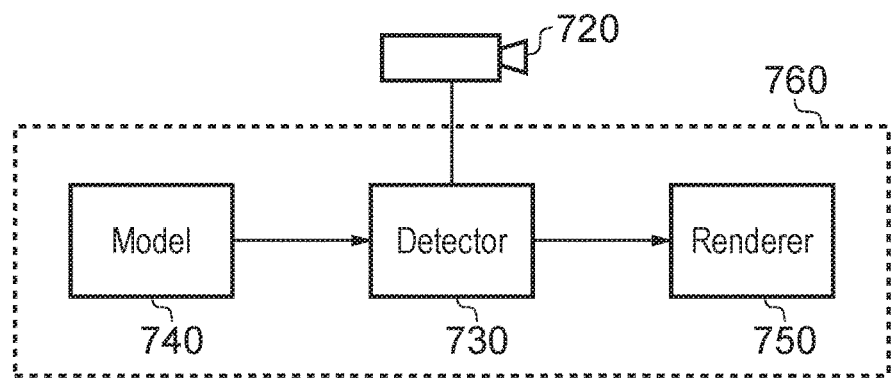
FIG. 21 schematically illustrates an image processing apparatus.

FIG. 21 schematically illustrates an image processing apparatus 760 operable to process an image, comprising: an image capturing device such as a camera 720 operable to capture an image of the head of a head mountable display device user, a detector 730 operable to detect the position of a head mountable display device in the image captured by the camera; and a processor (renderer) 750 operable to identify a region of the user's face that is occluded by the head mountable display device, the processor being operable to replace, at least partially, the portion of the captured image corresponding to the head mountable display device with a corresponding portion of a 3D facial model (for example, stored in a memory 740), to provide a modified image.

Figure 22:
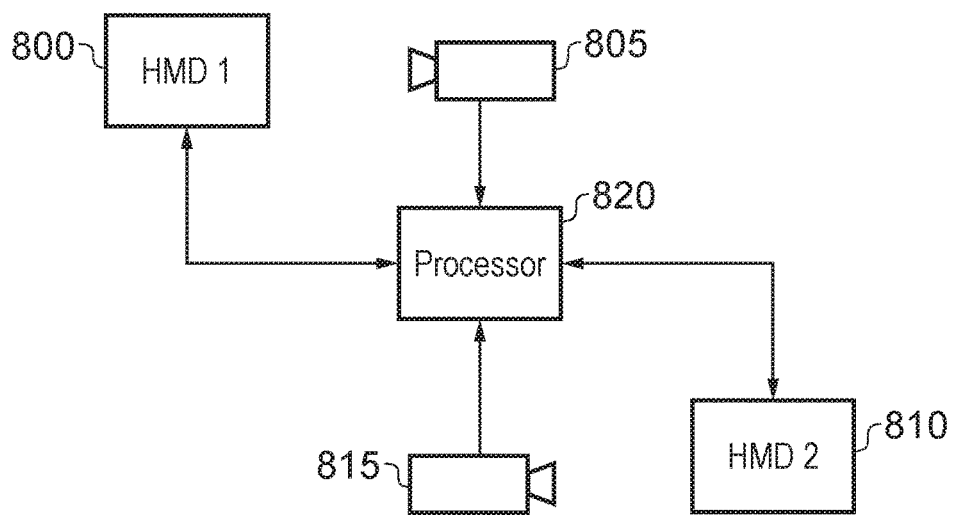
FIG. 22 schematically illustrates a communications system.

FIG. 22 schematically illustrates a communications system having first (800) and second (810) head mountable displays; respective cameras 805, 815 configured to capture images of the first and second head mountable displays in use (though if the HMDs were near one another, a single camera could be used to capture both), and an image processing apparatus 820 configured to replace, at least partially, the portion of a captured image corresponding to the first head mountable display device 800 with a corresponding portion of a 3D facial model, to provide a modified image for display by the second head mountable display 810, and to replace, at least partially, the portion of a captured image corresponding to the second head mountable display device 810 with a corresponding portion of a 3D facial model, to provide a modified image for display by the first head mountable display 800.

It will be appreciated that data signals generated by the variants of apparatus and methods discussed above, and storage or transmission media carrying such signals, are considered to represent embodiments of the present disclosure.

Where methods of processing are discussed above, it will be appreciated that apparatus configured to perform such methods are also considered to represent embodiments of the disclosure. It will also be appreciated that video storage, transmission, capture and/or display apparatus incorporating such techniques is considered to represent an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective embodiments are defined by the following numbered clauses:

1. An image processing method comprising:
    capturing an image of the head of a head mountable display device user;
    detecting the position of a head mountable display device in the image captured by the camera;
    identifying a region of the user's face that is occluded by the head mountable display device; and
    at least partially replacing the region of the captured image corresponding to the head mountable display device with a corresponding portion of a 3D facial model, to provide a modified image.

2. The image processing method of clause 1, comprising deriving the 3D facial model from captured images of the user's face.

3. The image processing method of clause 1, in which the 3D facial model is a model of a face other than the user's.

4. The image processing method of clause 1, wherein the corresponding portion comprises a superposition of a partly transparent image of the head mountable display device and the 3D facial model portion.

5. The image processing method of any of clauses 1 to 4, wherein the 3D facial model comprises a mapping of the interactions of facial muscles.

6. The image processing method of clause 1, wherein the facial model includes a representation of portions of the face other than those directly overlaid by the head mountable display in use.

7. The image processing method of clause 1, in which the identifying step comprises detecting an orientation of the head mountable display device and detecting occlusion of the user's face from a detected orientation of the head mountable display device.

8. The image processing method of clause 1, in which the identifying step comprises comparing a captured image of the user's face with a reference image.

9. The image processing method of clause 1, comprising rendering motion of the eyes in the modified image.

10. The image processing method of clause 9, comprising detecting the eye motion using one or more cameras mounted on the head mountable display device.

11. The image processing method of clause 9, comprising generating the eye motion by a computer.

12. The image processing method of clause 1, comprising:
  detecting facial muscle motion; and
  changing the generation of the modified image in accordance with the detected facial muscle motion.
13. The image processing method of clause 12, in which the step of detecting facial muscle motion comprises estimating the facial muscle motion from captured images.
14. The image processing method of clause 12, in which the step of detecting facial muscle motion comprises detecting the facial muscle motion using electromyography.
15. Computer software which, when executed by a computer, causes the computer to carry out the method of any one of the preceding clauses.
16. A machine-readable non-transitory storage medium which stores computer software according to clause 15.
17. An image processing apparatus operable to process an image, comprising:
  an image capturing device operable to capture an image of the head of a head mountable display device user;
  a detector operable to detect the position of a head mountable display device in the image captured by the camera; and
  a processor operable to identify a region of the user's face that is occluded by the head mountable display device, the processor being operable to replace, at least partially, the portion of the captured image corresponding to the head mountable display device with a corresponding portion of a 3D facial model, to provide a modified image.
18. A communications system comprising:
  first and second head mountable displays;
  one or more cameras configured to capture images of the first and second head mountable displays in use; and
  apparatus according to clause 17 configured to replace, at least partially, the portion of a captured image corresponding to the first head mountable display device with a corresponding portion of a 3D facial model, to provide a modified image for display by the second head mountable display, and to replace, at least partially, the portion of a captured image corresponding to the second head mountable display device with a corresponding portion of a 3D facial model, to provide a modified image for display by the first head mountable display.

We claim:

1. An image processing method comprising:
  capturing, by a camera, an image of a head of a user of a head mountable display device;
  detecting, by a detector device, a position of the head mountable display device in the image captured by the camera;
  identifying, by a processor device, a region of the user's face that is occluded by the head mountable display device; and
  the processor device at least partially replacing a region of the captured image corresponding to the head mountable display device with a corresponding portion of a 3D facial model to provide a modified image.
2. The image processing method of claim 1, comprising deriving the 3D facial model from captured images of the user's face.
3. The image processing method of claim 1, in which the 3D facial model is a model of a face other than the user's face.
4. The image processing method of claim 1, wherein the corresponding portion comprises a superposition of a partly transparent image of the head mountable display device and the 3D facial model.
5. The image processing method of claim 1, wherein the 3D facial model comprises a mapping of interactions of facial muscles.
6. The image processing method of claim 1, wherein the 3D facial model includes a representation of portions of a given face other than those portions directly overlaid by the head mountable display in use.
7. The image processing method of claim 1, in which the identifying step comprises detecting an orientation of the head mountable display device and detecting occlusion of the user's face from a detected orientation of the head mountable display device.
8. The image processing method of claim 1, in which the identifying step comprises comparing a captured image of the user's face with a reference image.
9. The image processing method of claim 1, comprising rendering motion of the user's eyes in the modified image.
10. The image processing method of claim 9, comprising detecting the eye motion using one or more cameras mounted on the head mountable display device.
11. The image processing method of claim 9, comprising generating the eye motion by a computer.
12. The image processing method of claim 1, comprising:
  detecting facial muscle motion; and
  changing generation of the modified image in accordance with the detected facial muscle motion.
13. The image processing method of claim 12, in which the step of detecting facial muscle motion comprises estimating the facial muscle motion from captured images.
14. The image processing method of claim 12, in which the step of detecting facial muscle motion comprises detecting the facial muscle motion using electromyography.
15. A machine-readable non-transitory storage medium which stores computer readable instructions thereon that, when executed by a computer, cause the computer to perform an image processing method comprising:
  capturing an image of a head of a user of a head mountable display device;
  detecting a position of the head mountable display device in the image captured by a camera;
  identifying a region of the user's face that is occluded by the head mountable display device; and
  at least partially replacing a region of the captured image corresponding to the head mountable display device with a corresponding portion of a 3D facial model, to provide a modified image.
16. An image processing apparatus operable to process an image, comprising:
  an image capturing device configured to capture an image of a head of a user of a head mountable display device;
  a detector configured to detect a position of the head mountable display device in the image captured by the image capturing device; and
  a processor configured to identify a region of the user's face that is occluded by the head mountable display device, the processor being further configured to replace, at least partially, a portion of the captured image corresponding to the head mountable display device with a corresponding portion of a 3D facial model, to provide a modified image.
17. A communications system comprising:
  first and second head mountable displays;
  one or more cameras configured to capture images of the first and second head mountable displays in use; and an image processing apparatus comprising:
- a detector configured to detect positions of the first and second head mountable displays in the images captured by the one or more cameras; and
- a processor configured to:
  - replace, at least partially, a portion of a captured image corresponding to the first head mountable display device with a corresponding portion of a 3D facial model, to provide a first modified image for display by the second head mountable display, and
  - replace, at least partially, a portion of a captured image corresponding to the second head mountable display with a corresponding portion of the 3D facial model, to provide a second modified image for display by the first head mountable display.

* * * * *